US009800516B2

(12) United States Patent
Chow

(10) Patent No.: US 9,800,516 B2
(45) Date of Patent: Oct. 24, 2017

(54) METHOD AND APPARATUS FOR MANAGING ALLOCATION OF COMMUNICATION RESOURCES

(71) Applicant: Change Healthcare LLC, Alpharetta, GA (US)

(72) Inventor: Ka Kiu Chow, Vancouver (CA)

(73) Assignee: Change Healthcare LLC, Alpharetta, GA (US)

( * ) Notice: Subject to any disclaimer, the term of this patent is extended or adjusted under 35 U.S.C. 154(b) by 340 days.

(21) Appl. No.: 14/228,742

(22) Filed: Mar. 28, 2014

(65) Prior Publication Data

US 2015/0281110 A1  Oct. 1, 2015

(51) Int. Cl.
*G06F 15/173* (2006.01)
*H04L 12/911* (2013.01)

(52) U.S. Cl.
CPC .................................. *H04L 47/70* (2013.01)

(58) Field of Classification Search
CPC ............. H04L 12/2856; H04L 12/2818; H04L 12/2461; H04L 12/2869; H04L 12/5692
USPC ......................................................... 709/235
See application file for complete search history.

(56) References Cited

U.S. PATENT DOCUMENTS

| | | | | |
|---|---|---|---|---|
| 2004/0199667 A1* | 10/2004 | Dobbins | ................. | H04L 12/14 709/240 |
| 2007/0063998 A1* | 3/2007 | Mahesh | ................. | G06F 19/321 345/419 |
| 2007/0289024 A1* | 12/2007 | Mohammed | .......... | G06F 21/604 726/28 |
| 2008/0072230 A1* | 3/2008 | Jackson | ................. | G06F 9/4843 718/104 |
| 2010/0228989 A1* | 9/2010 | Neystadt | ................. | G06F 21/10 713/185 |
| 2010/0309846 A1* | 12/2010 | Rune | ................... | H04L 12/5691 370/328 |
| 2011/0197254 A1* | 8/2011 | Sallaka | ............... | G06F 21/6218 726/1 |

* cited by examiner

*Primary Examiner* — Sm Rahman
(74) *Attorney, Agent, or Firm* — Alston & Bird LLP

(57) ABSTRACT

A method, apparatus and computer program product are provided in order to provide management of allocation of communication resources. An example method may include receiving a first request for a communication resource for use to establish a communication channel between a client device and an application server, determining a request type of the first request, determining, using a processor, that a request type ban is not in effect for the request type of the first request, in response to determining that the request type ban is not in effect for the request type, granting the first request by allocating the communication resource to the client device, determining that the client device has maintained allocation of the communication resource for greater than a threshold amount of time, and in response to determining that the client device has maintained allocation of the communication resource for greater than the threshold amount of time, initiating the request type ban for the request type of the first request.

18 Claims, 5 Drawing Sheets

METHOD AND APPARATUS FOR MANAGING ALLOCATION OF COMMUNICATION RESOURCES

Example embodiments of the present invention relate generally to resource allocation and, more particularly, to techniques for managing allocation of communication resources of a server.

BACKGROUND

As network technology has advanced, it is more and more common for users to interact with applications hosted remotely from their local computer. So-called cloud-based or server-based applications serve to reduce the system requirements imposed on client computers while also providing centralized access to hosted data. However, due to the complexity of hosting applications remotely, it is common for application servers to have intermediate web servers that manage communications with the back-end application servers. These web servers may serve requests for a variety of different applications hosted across one or more application servers.

The use of such web servers may be constrained based on the resources available to the web server. Constraints on available network bandwidth, processing power, storage, or system memory may result in certain access limitations being imposed on users. These constraints may limit the number of simultaneous users, sessions, or processes used to communicate with the application servers. Furthermore, remote access software may limit the number of instances, processes, or licensed users based on licensing agreements between the author of the remote access software and the administrators of the web server.

In cases where access to a back-end server is constrained by a set of communication resources, if too many processes or users attempt to communicate with the application servers via the web server, access for one or more of those processes or users may fail due to the web server having insufficient resources to service the request. In cases where an application hosted on an application server fails, client computers may remain connected with the web server, but unable to complete the task for which they connected to the application server. Requests for the failed application may continue to be received by the web server. Although these requests may be associated with a timeout value, the timeout value may result in requests taking longer to fail than new requests are received, resulting in limited communication resources being allocated more quickly than they are released. Eventually, the entire pool of resources may be reserved for requests associated with the failed application, resulting in an inability to service requests for other, functional applications that the web server would otherwise process. Detecting a failure on the back-end application server and sending a notification to an administrative user or service does not solve this problem, as it requires a user to manually take action to correct the error or restart the hanging process. Until this manual action takes place, the incoming requests will continue to hang. Even in the case where back-end processes provide status information, it may not be clear if there is an actual error or if other factors are preventing status information from being received (e.g., network load, slow retrieval of large data files, etc.). In such a case, an error may not be returned until the request times out. If requests continue to be received faster than they can time out, the requests may overwhelm the available communicate resources and render web server unusable. Through applied effort, ingenuity, and innovation, Applicant has solved many of these identified problems by developing a solution that is embodied by the present invention, which is described in detail below

BRIEF SUMMARY

A method, apparatus and computer program product are therefore provided according to an example embodiment of the present invention in order to provide for improved allocation of communication resources. An example embodiment provides a method including receiving a first request for a communication resource for use to establish a communication channel between a client device and an application server, determining a request type of the first request, determining, using a processor, that a request type ban is not in effect for the request type of the first request, in response to determining that the request type ban is not in effect for the request type, granting the first request by allocating the communication resource to the client device, determining that the client device has maintained allocation of the communication resource for greater than a threshold amount of time, and, in response to determining that the client device has maintained allocation of the communication resource for greater than the threshold amount of time, initiating the request type ban for the request type of the first request. In some embodiments, the method may include receiving a second request of a same request type as the first request, determining that the request type ban is in effect for the same request type as the first request, and in response to determining that the request type ban is in effect, denying the second request. The method may further include determining that the communication resource completed a task or that the communication resource has timed out, deallocating the communication resource, and rescinding the request type ban in response to determining that the communication resource has completed the task or timed out. The communication resource may be a process that establishes a communication channel between a web server and the application server. The application server may be a picture archiving and communications system. A type counter associated with all requests of the same type as the first request may be incremented in response to determining that the client device has maintained allocation of the communication resource for greater than the threshold amount of time, and the request type ban may be instated in response to the type counter meeting or exceeding a threshold value. The method may also include decrementing the type counter in response to determining that the communication resource completed a task or that the communication resource has timed out, and rescinding the request type ban in response to determining that the type counter is less than the threshold value. The threshold amount of time may be less than a timeout time associated with the communication resource.

Embodiments may also provide an apparatus. The apparatus includes processing circuitry configured to cause the apparatus to receive a first request for a communication resource for use to establish a communication channel between a client device and an application server, determine a request type of the first request, determine that a request type ban is not in effect for the request type of the first request, in response to determining that the request type ban is not in effect for the request type, grant the first request by allocating the communication resource to the client device, determine that the client device has maintained allocation of the communication resource for greater than a threshold amount of time, in response to determining that the client device has maintained allocation of the communication resource for greater than the threshold amount of time, initiate the request type ban for the request type of the first request. The apparatus may be further caused to receive a second request of a same request type as the first request, to determine that the request type ban is in effect for the same request type as the first request, and in response to determining that the request type ban is in effect, deny the second request. The apparatus may be further caused to determine that the communication resource completed a task or that the communication resource has timed out, to deallocate the communication resource, and to rescind the request type ban in response to determining that the communication resource has completed the task or timed out. The communication resource may be a process that establishes a communication channel between a web server and the application server. The application server may be a picture archiving and communications system. A type counter may be associated with all requests of the same type as the first request is incremented in response to determining that the client device has maintained allocation of the communication resource for greater than the threshold amount of time, and the request type ban may be instated in response to the type counter meeting or exceeding a threshold value. The apparatus may be further caused to decrement the type counter in response to determining that the communication resource completed a task or that the communication resource has timed out, and to rescind the request type ban in response to determining that the type counter is less than the threshold value. The threshold amount of time may be less than a timeout time associated with the communication resource.

Embodiments may also provide a computer program product including at least one computer-readable storage medium bearing computer program instructions embodied therein for use with a computer. The computer program instructions may include program instructions configured to receive a first request for a communication resource for use to establish a communication channel between a client device and an application server, to determine a request type of the first request, to determine that a request type ban is not in effect for the request type of the first request, in response to determining that the request type ban is not in effect for the request type, to grant the first request by allocating the communication resource to the client device, to determine that the client device has maintained allocation of the communication resource for greater than a threshold amount of time, and in response to determining that the client device has maintained allocation of the communication resource for greater than the threshold amount of time, to initiate the request type ban for the request type of the first request. The computer program product may further include program instructions may be further configured to receive a second request of a same request type as the first request, to determine that the request type ban is in effect for the same request type as the first request, and in response to determining that the request type ban is in effect, to deny the second request. The computer program product may further include program instructions configured to determine that the communication resource completed a task or that the communication resource has timed out, to deallocate the communication resource, and to rescind the request type ban in response to determining that the communication resource has completed the task or timed out. The communication resource may be a process that establishes a communication channel between a web server and the application server.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
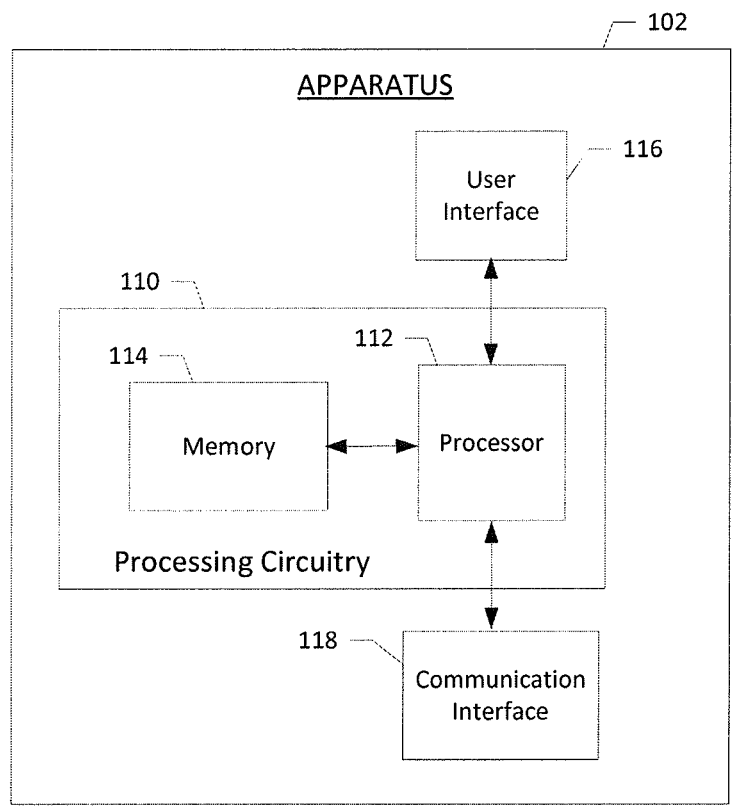
Figure 2:
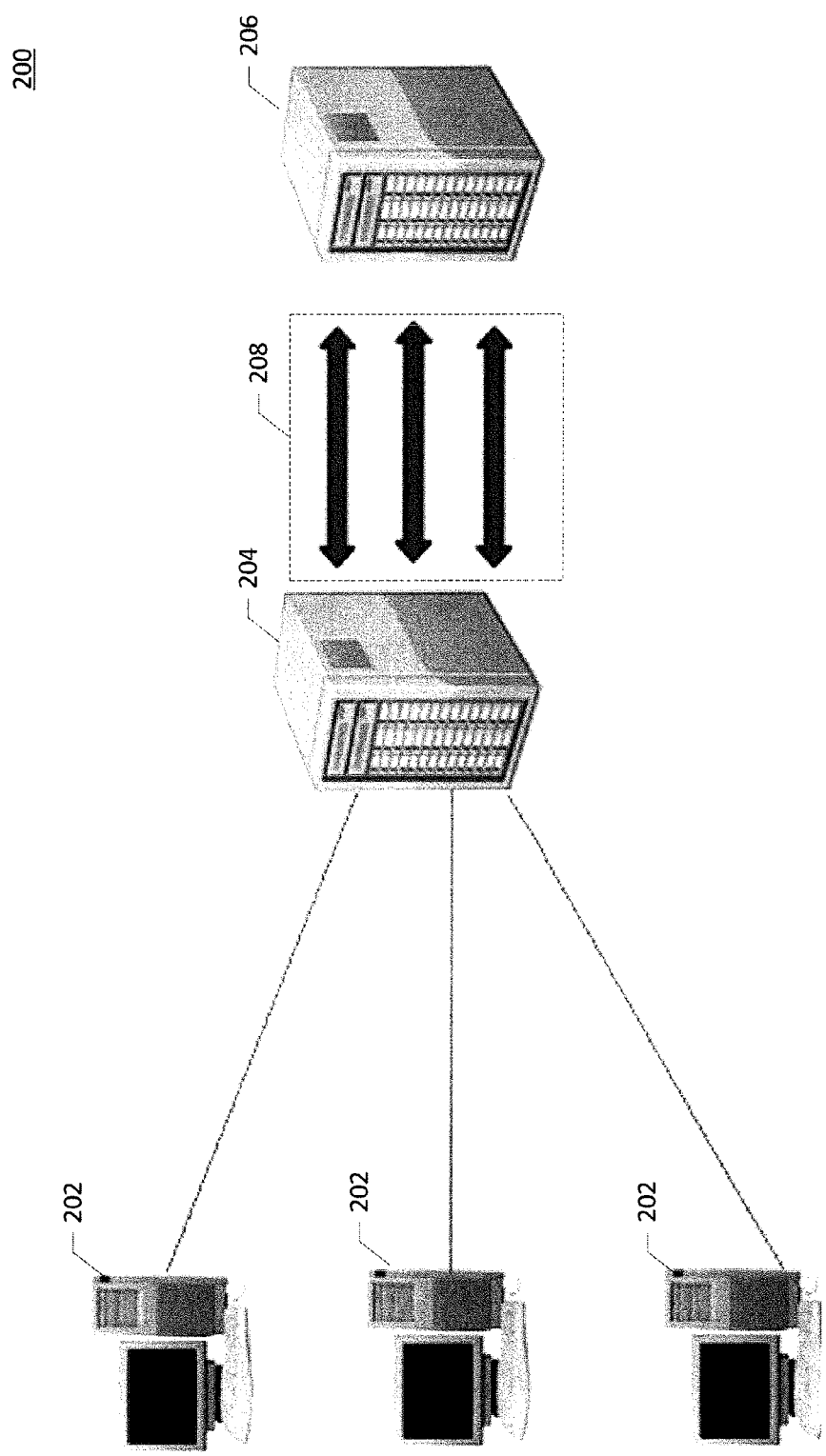
Figure 3:
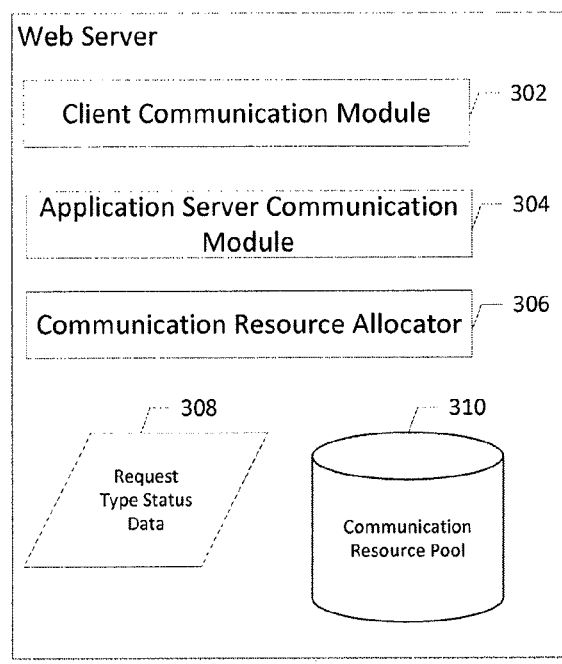
Figure 4:
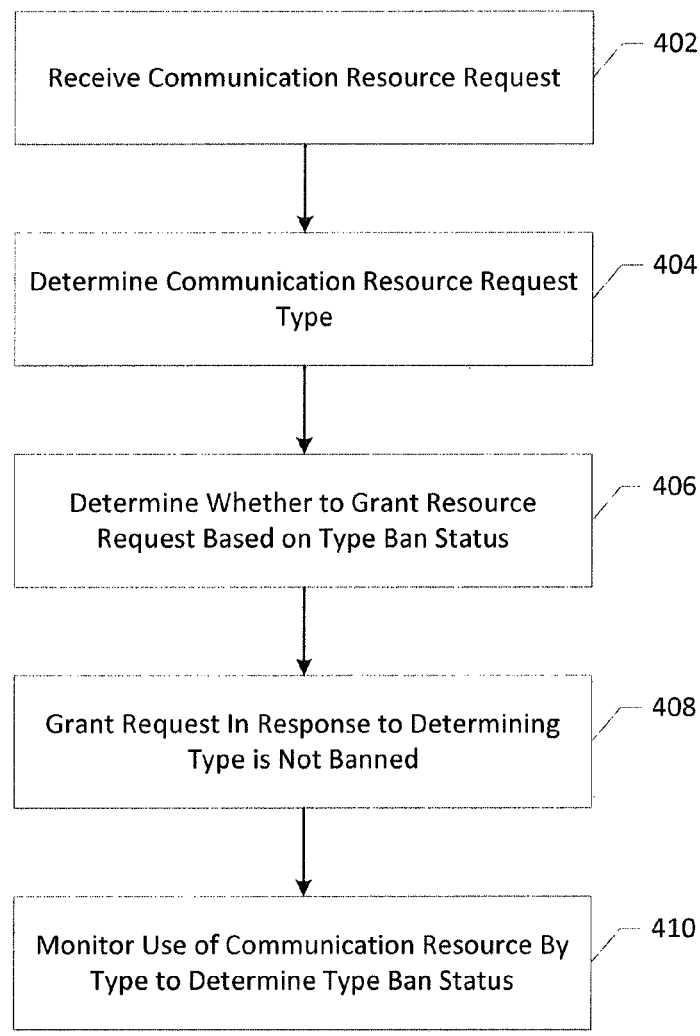
Figure 5:
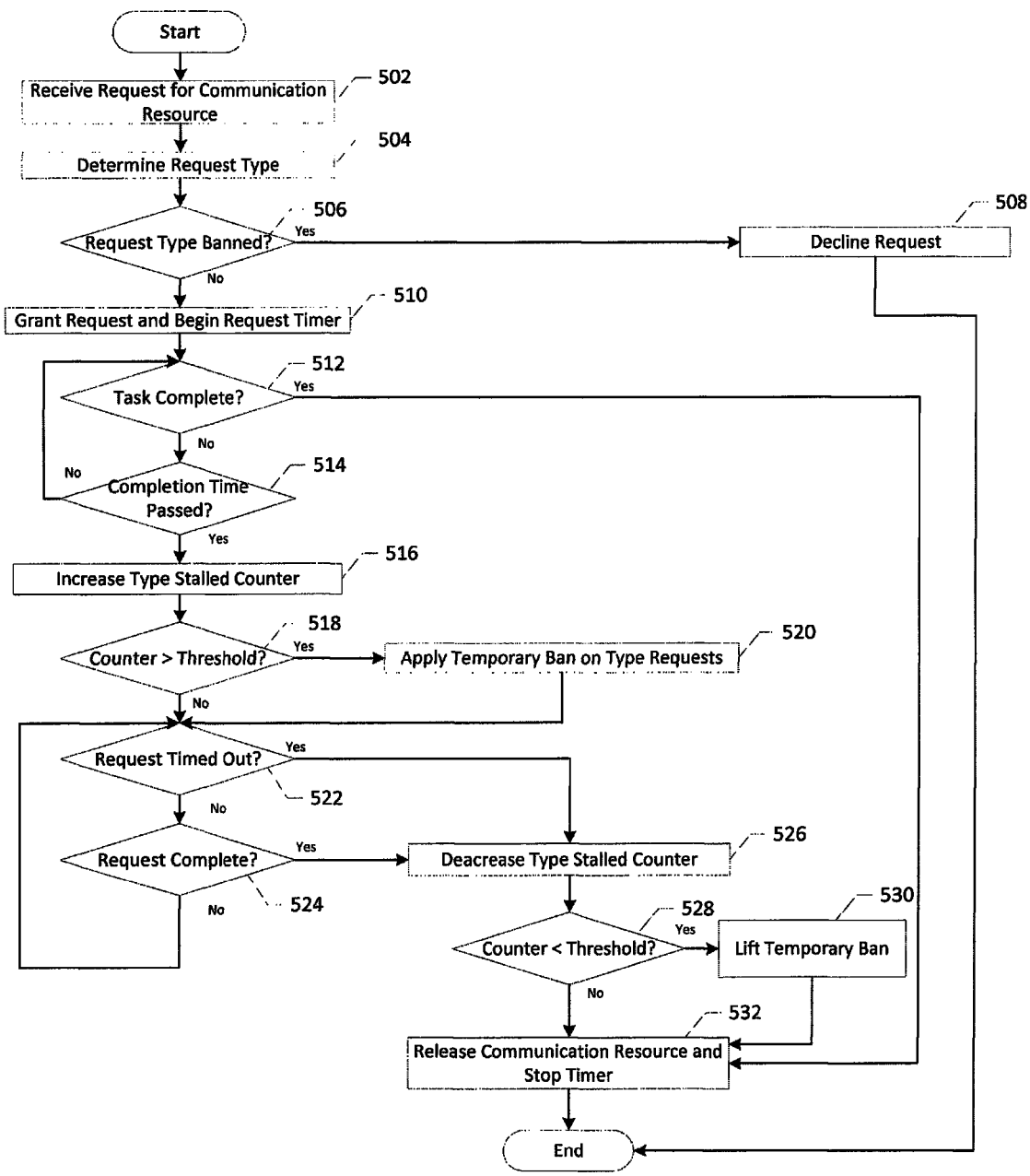

Having thus described certain embodiments of the invention in general terms, reference will now be made to the accompanying drawings, which are not necessarily drawn to scale, and wherein:

FIG. 1 is a block diagram of an apparatus that may be specifically configured in accordance with example embodiments of the present invention;

FIG. 2 is an architecture diagram of an example application hosting environment in accordance with example embodiments of the present invention;

FIG. 3 is a block diagram of an example web server in accordance with example embodiments of the present invention;

FIG. 4 is a flow diagram of an example process for allocating communication resources in accordance with example embodiments of the present invention; and FIG. 5 is a flow diagram of an example process for managing a communication resource request in accordance with embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with an example embodiment of the present invention in order to provide for improved allocation of communication resources. In this regard, a method, apparatus and computer program product of an example embodiment may receive a request for a communication resource, such as a request to connect to a remote application via a web server. Embodiments may determine an identity of a function, process, or application associated with the request, and monitor use of the resource to determine the status of the function, process, or application. If the use of the communication resource continues beyond a threshold period of time, embodiments may note that the function, process, or application using the communication resource has stalled or is otherwise idle. In the event more than a threshold number of functions, processes, or applications of the same type are stalled or idle, embodiments may deny further requests relating to the same function, process, or application until less than the threshold number of functions, processes, or applications are stalled or idle. In this manner, embodiments may ensure that communication resources remain available for other functions, processes, or applications while still managing requests for the stalled or idle function, process, or application.

For the purpose of this application, the term "request type" refers to a function, process, or application associated with a request for a particular communication resource. For example, a client request may be related to a particular application executing on a back end server remote from the client, such that the request type is the particular application. Additionally or alternatively, the term "request type" may relate to a specific application instance, a type of application, or an application associated with a particular application server. Request types may also include the application, component, or module to which the request belongs, the actual function called (e.g., a function name or identifier), a process identifier, a specific operation being requested in the request, how the operation is being used (e.g., operations that send information, operations that receive information, operations that both send and receive information), the type of information being sent or received (e.g., file extensions or network data types), the file size of the requested information, the transport protocol of the information, the originator of the request (e.g., a browser or workstation identifier), or a destination node of the request (e.g., a database server, a network attached storage device, etc.).

For the purposes of this application, the term "communication resource" refers to any hardware, software, or combined hardware and software element of a computing system that may be allocated to facilitate communication by a client with another computing system and which is also part of a limited allocation pool. Communication resources may include, but are not necessarily limited to, application instances, processes, processors, threads, storage amounts, network bandwidth, or the like.

Example Apparatus

FIG. 1 illustrates a block diagram of an apparatus 102 in accordance with some example embodiments. The apparatus 102 may be any computing device capable of allocating communication resources as described herein. For example, the apparatus 102 may be implemented as a web server (standalone or rack-mounted) or a desktop computer. The apparatus 102 may be operable to facilitate communication between two or more computers, such as one or more client computers accessing applications executing on one or more application servers. To facilitate this communication, the apparatus 102 may provide a pool of communication resources used by one or more modules that enable the communication between the client computers and the application servers. The apparatus 102 may further include logic for allocating these communication resources in an intelligent and efficient manner to maximize the ability of client computers to communicate with application servers. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 in order to carry out the functionality associated with each respective application. In some cases, the memory 114 may be in communication with one or more of the processor 112, user interface 116, or communication interface 118 via a bus or buses for passing information among components of the apparatus 102.

The user interface 116 may be in communication with the processing circuitry 110 to receive an indication of a user input at the user interface 116 and/or to provide an audible, visual, mechanical or other output to the user. As such, the user interface 116 may include, for example, a keyboard, a mouse, a joystick, a display, a touch screen display, a microphone, a speaker, a Light Emitting Diode (LED), a lighting device, and/or other input/output mechanisms.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example Architecture

FIG. 2 is an architecture diagram of an example application hosting environment 200 implementing embodiments of the present invention for management of communication resources. The hosting environment includes a plurality of client devices 202 in communication with a web server 204. The web server 204 facilitates communication with one or more application servers 206. Communication between the web server 204 and the application server 206 may be provided via a set of communication resources 208, herein depicted as a plurality of channels for communication between the web server 204 and the application server 206. For example, in some embodiments, the web server may serve as a gateway for a client to access a picture archiving and communication system (PACS) hosted on the application server 206. It should be appreciated that while the present example includes a plurality of clients 202 and a single web server 204 and application server 206, various additional or alternative embodiments could include varying numbers of particular devices, apparatuses, and computing nodes. The client devices 202, the web server 204, and the application server 206 may be computing devices as known in the art. For example, the client devices 202, the web server 204, and the application server 206 may be apparatuses such as the apparatus 102 as described above with respect to FIG. 1. It should also be appreciated that in some embodiments, various elements could be implemented in more or fewer components. For example, the web server 204 and the application 206 may not be discrete computer chasses as depicted in FIG. 2, but rather may both be present on the same server rack.

The communication resources 208 may include a plurality of processes responsible for accessing, managing, and/or configuring a channel between the web server 204 and the application server 206. For example, each of the communication resources 208 may be a separate process executing on the web server, where each process allows one client to communicate with one server. Communications between the client devices 202 and the application server 206 may thus be constrained by the number of available processes executing on the web server 204. In the event of a failure of an application or an application server, these communication resources may rapidly be consumed by clients waiting for a timeout condition to occur. As such, the web server 204 may implement various methods, processes, and techniques to prevent the failure of the application or application server from impacting communications with other, functional applications and application servers through the use of a communication resource allocation method as described herein.

Example Web Server

FIG. 3 is a block diagram illustrating an example web server 300 for allocating communication resources in accordance with embodiments of the present invention. The web server 300 may be implemented as a computing device, such as the apparatus 102 described above with respect to FIG. 1. The web server 300 may function as a gateway for a client device to communicate with one or more application servers, such as the web server 204 described above with respect to FIG. 2. The web server 300 may comprise a client communication module 302, an application server communication module 304, and a communication resource allocator 306.

The client communication module 302 may be responsible for establishing a channel between the client device and the web server 300. For example, the client communication module 302 may verify and authenticate the identity of a particular client, receive a request to connect to a particular application hosted on an application server, and relay input from the client device to the application server. Upon receiving an incoming request from a client, the client communication module 302 may invoke the application server communication module 304 to establish a channel to the particular application server.

In order to establish the channel to the particular application server, the application server communication module 304 may require communication resources of the web server 300. In the present example, these communication resources are represented as a communication resource pool 310, which includes a particular number of available processes for establishing a channel from a client device to a particular application server. For example, the web server 300 may only be capable of executing a particular number of processes to provide such a channel due to hardware constraints (e.g., lack of memory, storage, or processor power) or software constraints (e.g., lack of software licenses).

In order to efficiently allocate the communication resources available in the communication resource pool 310, the web server 300 may employ a communication resource allocator 306 to manage allocation of communication resources for use by the application server communication module 304. The communication resource allocator 306 may allocate the communication resources according to various methods and processes, such as described below with respect to FIGS. 4 and 5. To this end, the communication resource allocator 306 may store status information for the type of each incoming request that requires the use of a communication resource. For example, each incoming request may be associated with a particular request type relating to the process, function, or application associated with the request. The request type status data 308 may be maintained by the communication resource allocator 306 to determine when, whether, and how to allocate communication resources to incoming requests to ensure that the communication resources are allocated in a manner that ensures that a failed application server or application does not result in a failure of incoming communication requests not related to the failed application server or application. As described above, request types may be associated with various attributes of the incoming request. These attributes may be appended to the request and included within the request, or the web server may determine the request type based on various other data. For example, the request may include one or more data fields identifying the calling function, a process identifier, an operation provided by the request, or the like. Alternatively, the web server may infer request type information based on the destination of the request, an internet protocol address of the requesting device, or any other method for determining the example request types enumerated above.

Example Processes for Allocating Communication Resources

FIG. 4 is a flow diagram of an example process 400 for efficiently allocating communication resources in accordance with embodiments of the present invention. In some embodiments, the process 400 may be performed by a communication resource allocator, such as described above with respect to FIG. 3. The process 400 may serve to allocate communication resources while monitoring for ongoing requests that exceed a particular time threshold. The process 400 may determine which applications, processes, or calling functions are associated with pending, idle, or stalled channels and, in the event a particular application, process, or calling function is associated with greater than a threshold number of pending, stalled, or idle channels, future requests related to that application, process, or calling function may be denied until the number of pending, stalled, or idle channels is reduced below the threshold number. In this manner, communication resources may be allocated such that a failed application or application server does not impact the assignment of communication resources to other applications or application servers. Embodiments of the process 400 may be performed by an apparatus, such as the apparatus 102 described with respect to FIG. 1, a web server 204 as described with respect to FIG. 2, and/or a web server 300 as described with respect to FIG. 3. In some embodiments, such an apparatus executes a communication resource allocator to facilitate the operations of the process 400, such as the communication resource allocator 306 described with respect to FIG. 3.

At action 402, the process 400 receives a communication resource request. For example, a client device may send a request to a web server to access a particular application server. This request may be initiated by or associated with a particular application (e.g., the application executing on the application server), process, or calling function. At action 404, the type of application, process, or calling function associated with the request is determined. For example, an incoming request may include a type identifier, such as an identifier for the particular application that caused the request on the client or an identifier for the application requested to be accessed on the application server. Additionally or alternatively, in some embodiments the request type may be determined from the application server in response to establishing a connection to the application server.

At action 406, a determination is made as to whether to grant the communication resource request based on whether the request type is associated with a request type ban. The use of request type bans ensures that applications that are stalled or idle with unreleased communication resources do not consume the entire communication resource pool, as consumption of the entire communication resource pool may result in the inability for applications not associated with stalled or idle instances to execute.

For example, consider a scenario where a web server has a particular number of available channel processes for communicating with any one of 3 application servers. Channel processes may be assigned to connecting clients on a "first come, first served" basis, such that channels are allocated to the first client making the request. If the first application server suffers a failure, communication resources allocated for communication with that server may not be released until each individual channel times out. If incoming requests are received more quickly than the time out interval, then requests for the first, failed application server will eventually use up the entire pool, crowding out requests for the other two application servers even though they are still functional. As such, by tracking the type of incoming request, a status for a particular application, process, or function may be determined and used to handle future requests of the same type. If too many resources are allocated to a particular request type, then processing of further requests of the same type may be automatically denied, thus preventing the one request type from consuming the entire communication resource pool.

At action 408, the incoming communication resource request is granted in response to determining that the request type is not banned. Granting of the request may include allocating sufficient communication resources to the client that sent the request for the client to perform the request. For example, the web server may establish a channel between the client and a particular application server for use by the client to access an application executing on the application server.

At action 410, the allocated communication resource is monitored to determine whether the type of request should be banned. In the event the communication resource stalls or otherwise becomes unresponsive (e.g., a hardware or software failure occurs on the application server associated with the established channel), then the communication resource may remain allocated unless and until a timeout condition occurs. By monitoring whether a communication resources have become idle or stalled for greater than a threshold period of time, the process can identify when particular applications or application servers have failed. Such a determination may occur in response to detection that greater than a threshold number of communication resources have been stalled or idle for at least a particular period of time. This ongoing status monitoring may continue as long as communication resources are allocated, to ensure efficiency in future allocation of communication resources.

FIG. 5 is a flow diagram of an example process 500 for managing a communication resource request in accordance with embodiments of the present invention. As described above, embodiments may efficiently allocate communication resources by monitoring the status of particular request types, and denying requests of a particular type if that particular type is associated with greater than a threshold number of stalled, idle, or pending tasks. The process 500 describes one possible implementation for using these type status indicators to ensure that communication resources are allocated in such a way as to reduce the chance that a failure of a single application or application server does not impact resource allocation to other applications or application servers. The process 500 may be performed by an apparatus, such as the apparatus 102 described with respect to FIG. 1, a web server 204 as described with respect to FIG. 2, and/or a web server 300 as described with respect to FIG. 3. In some embodiments, such an apparatus executes a communication resource allocator to facilitate the operations of the process 500, such as the communication resource allocator 306 described with respect to FIG. 3.

At action 502, a request is received for a communication resource. For example, a request may be received to use a communication process for which the web server only has a particular number of licenses. At action 504, the type of the request is determined. As described above, the type may, for example, be related to the application making the request, that application that is the subject of the request, or the application server hosting the application to which the client wishes to connect. At action 506, a determination is made as to whether the type of the request determined at action 504 is banned. As described above, request types may be banned in response to a determination that the request type has greater than a threshold number of pending, idle, or stalled communication resources allocated. If the request type is banned, the process 500 proceeds to action 508 and the request is denied. Otherwise, the process 500 proceeds to action 510.

At action 510, the request is granted, the communication resource is allocated, and a timer is initiated for the request. The timer may be employed to determine if the requested use of the communication resource is taking longer than expected, which may be an indication of a stalled or idle task. The length of the timer may be determined based on the request type or various other factors. For example, some applications may typically require more time with the communication resource to perform their associated processing than others, and as such may be afforded a longer timer. It should be appreciated that the timer as described herein is separate and distinct from a "timeout" value associated with the request or communication resource. The timer is used for the purpose of determining whether there is a problem across resource allocations for a particular type, and expiration of the timer does not necessarily result in an end to the associated task or a deallocation of the communication resource. In contrast, in the present context, the term "timeout" is understood to mean a condition that would result in an end to the associated task and/or deallocation of the communication resource. Such a timeout may be caused by a failure to receive any communication on a particular channel associated with the communication resource for a particular time, or by the failure to complete a task in a designated absolute time (e.g., even in a case where the application server is responsive, a timeout condition may still occur if an absolute allocation time is exceeded).

At action 512, a determination is made as to whether the task associated with the request is complete. If the task is complete, the process 500 proceeds to action 532, where the communication resource is released and the timer is stopped. If the task is not complete, the process 500 proceeds to action 514.

At action 514, the process 500 determines whether the timer has exceeded a completion time associated for the particular task. As described above, the expected completion time may be determined on a task-by-task or type-by-type basis. In some embodiments, the task completion time may be determined dynamically based on performance of the tasks. For example, the completion time of successful tasks may be monitored by the process, and the longest time to successfully complete may be used as the expected task completion time. As a particular example, an expected task completion time for a particular task may be set to 3 seconds. Monitoring tasks of the particular type for a few days may result in the process receiving data that indicates that on some occasions, a task of the particular type has taken up to 4 seconds to complete. As such that expected completion time for tasks of the particular type may be adjusted to 4 seconds. Similarly, the expected completion time may be adjusted downward in response to detecting that a threshold number of tasks or tasks over a threshold period of time have never taken longer than a particular amount of time to complete. If the expected task completion time has been exceeded, the process 500 proceeds to action 516. Otherwise, the process 500 returns to action 512 to continue to monitor the task.

At action 516, the process 500 increases a "Type stalled" counter associated with the task type of the original request. This type stalled counter tracks how many tasks of the particular type have failed to complete in the expected time. By tracking the number of tasks of a particular type that appear to have become stalled or idle, the process 500 can avoid allocating additional resources to the task type until some of those stalled or idle tasks have completed or timed out, thus releasing their communication resources.

At action 518, a determination is made as to whether the type stalled counter has exceeded a threshold value. The threshold value may be determined based on the task type, or based on the available communication resources of the web server. For example, the threshold value may be a particular percentage of the number of communication resources available, or a value associated with the particular type of the request. The threshold number of idle instances (number of idle instance allowed prior to the ban) can be determined in a variety of ways and can be modified base on the web server's available resources and failure tolerance. For example, the threshold can be determined based on the percentage of all instances (e.g., a certain predefined percentage of the possible instances are permitted to be idle/stalled/failed), or based on the number of instances expected (e.g., derived from historical usage data) Usage patterns (e.g., how often each request type is actually called) can be observed by analyzing log files for the web server. It should be appreciated that data may differ for different applications or web servers due to the size of the application (e.g., while a given threshold is acceptable for facilities with less than 50 workstations, it may not be acceptable for facilities with over 300 workstations).

As a particular example for how a threshold may be determined, a single threshold for all request types in some instances. For example, a single threshold may be appropriate when all request types are called at the same rate. This will likely result in the percentage of calls to each request being the same. Alternatively, each request type may have a separate threshold, or different thresholds may be associated with particular request properties. In some embodiments, thresholds may be determined using a set of weighted parameters. For example, a threshold may be determined by multiplying a weight value by the maximum number of instances available in the resource pool for that instance. The weight value may be assigned based on the frequency of calls for or within that application.

As a particular example of a process for determining a threshold, consider an example scenario with four request types that access the same request pool. A first request type occurs 10% of the time. A second request type occurs 20% of the time, a third request type occurs 30% of the time, and a fourth request type occurs 40% of the time. If this example pool includes 60 instances, a threshold for each request type may be determined by multiplying the percentage likelihood of each request by the total number of available requests, such that the first request type has a threshold of 6 pending idle/stalled requests, the second request type a threshold of 12 requests, the third request type a threshold of 18 requests, and the fourth request type a threshold of 24 requests. It should be appreciated that for request types that access different communication resource pools, the threshold may be determined using the size of the pool associated with the particular request type. If the type stalled counter has exceeded the threshold, the process 500 proceeds to action 520. Otherwise the process 500 proceeds to action 522.

At action 520, a temporary ban is applied to requests of the request type, such that new incoming requests of the same type as the received request will be denied unless and until the number of stalled tasks decreases below the threshold value. After applying the temporary ban, the process 500 proceeds to action 522 to continue processing of the task using the allocated communication resource.

At action 522, a determination is made as to whether the request, associated task, and/or communication resource have timed out. As described above, a timeout condition may result in an immediate failure of the task, such that the process 500 proceeds to action 526 to proceed with deallocation of the communication resource if a timeout has occurred. Otherwise, if a timeout has not occurred, the process 500 proceeds to action 524.

At action 524, a determination is made as to whether the request has completed successfully. If the request has completed successfully, the process 500 proceeds to action 526 to proceed with deallocation of the communication resource. Otherwise, the process 500 returns to action 522 to continue monitoring for a timeout condition or completion state.

At action 526, the type stalled counter is decremented to reflect the fact that the communication resource will be relinquished, either due to a timeout or due to the task associated with the requested communication resource completing. The process 500 then proceeds to action 528, where a determination is made as to whether decrementing the type stalled counter causes the type stalled counter to decrease below the threshold that results in a type ban being applied to requests of the particular type. If the type stalled counter decreases below the threshold, the process 500 proceeds to action 530 where the type ban is removed and future requests of the type are allowed to proceed. At action 530, the type ban is lifted and then the process proceeds to action 532 to release the communication resource. Otherwise, if the type stalled counter is still greater than the threshold, the process 500 proceeds directly to action 532 to release the communication resource. At action 532, the communication resource is released and the process 500 ends.

It should be appreciated that the process 500 depicts only a single flow for a single request, and that multiple instances of the process 500 may be employed in parallel to handle a plurality of requests received by the web server. Some values utilized by the process 500, such as the type stalled counter, may be global to all requests of the same type across each parallel process, while other values may be local to the particular process associated with the particular request.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 114 of an apparatus employing an embodiment of the present invention and executed by a processor 112 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a first request for a communication resource for use to establish a communication channel between a client device and an application server;
determining a request type of the first request, wherein the request type comprises a request for a particular application, a type of application, or a request for an application associated with a specific server;
determining, using a processor, that a request type ban is not in effect for the request type of the first request;
in response to determining that the request type ban is not in effect for the request type, granting the first request by allocating the communication resource to the client device;
determining that the client device has maintained allocation of the communication resource for greater than a threshold amount of time, wherein the threshold amount of time is established based on the request type of the first request and observed completion time to complete tasks of the request type of the first request, wherein a type counter associated with all requests of the same type as the first request is incremented in response to determining that the client device has maintained allocation of the communication resource for greater than the threshold amount of time, and wherein the request type ban is instated in response to the type counter meeting or exceeding a threshold value; and
in response to determining that the client device has maintained allocation of the communication resource for greater than the threshold amount of time, initiating the request type ban for the request type of the first request.

2. The method of claim 1, further comprising:
receiving a second request of a same request type as the first request;
determining that the request type ban is in effect for the same request type as the first request; and
in response to determining that the request type ban is in effect, denying the second request.

3. The method of claim 1, further comprising:
determining that the communication resource completed a task or that the communication resource has timed out;
deallocating the communication resource; and
rescinding the request type ban in response to determining that the communication resource has completed the task or timed out.

4. The method of claim 1, wherein the communication resource is a process that establishes a communication channel between a web server and the application server.

5. The method of claim 1, wherein the application server is a picture archiving and communications system.

6. The method of claim 1, further comprising:
decrementing the type counter in response to determining that the communication resource completed a task or that the communication resource has timed out; and
rescinding the request type ban in response to determining that the type counter is less than the threshold value.

7. The method of claim 1, wherein the threshold amount of time is less than a timeout time associated with the communication resource.

8. An apparatus comprising processing circuitry configured to cause the apparatus to:
receive a first request for a communication resource for use to establish a communication channel between a client device and an application server;
determine a request type of the first request, wherein the request type comprises a request for a particular application, a type of application, or a request for an application associated with a specific server;
determine that a request type ban is not in effect for the request type of the first request;
in response to determining that the request type ban is not in effect for the request type, grant the first request by allocating the communication resource to the client device;
determine that the client device has maintained allocation of the communication resource for greater than a threshold amount of time, wherein the threshold amount of time is established based on the request type of the first request and observed completion time to complete tasks of the request type of the first request, wherein a type counter associated with all requests of the same type as the first request is incremented in response to determining that the client device has maintained allocation of the communication resource for greater than the threshold amount of time, and wherein the request type ban is instated in response to the type counter meeting or exceeding a threshold value; and in response to determining that the client device has maintained allocation of the communication resource for greater than the threshold amount of time, initiate the request type ban for the request type of the first request.

9. The apparatus of claim 8, caused to:

receive a second request of a same request type as the first request;

determine that the request type ban is in effect for the same request type as the first request; and in response to determining that the request type ban is in effect, deny the second request.

10. The apparatus of claim 8, further caused to:

determine that the communication resource completed a task or that the communication resource has timed out;

deallocate the communication resource; and rescind the request type ban in response to determining that the communication resource has completed the task or timed out.

11. The apparatus of claim 8, wherein the communication resource is a process that establishes a communication channel between a web server and the application server.

12. The apparatus of claim 8, wherein the application server is a picture archiving and communications system.

13. The apparatus of claim 8, further caused to:

decrement the type counter in response to determining that the communication resource completed a task or that the communication resource has timed out; and rescind the request type ban in response to determining that the type counter is less than the threshold value.

14. The apparatus of claim 8, wherein the threshold amount of time is less than a timeout time associated with the communication resource.

15. A computer program product comprising at least one non-transitory computer-readable storage medium bearing computer program instructions embodied therein for use with a computer, the computer program instructions comprising program instructions configured to:

receive a first request for a communication resource for use to establish a communication channel between a client device and an application server;

determine a request type of the first request, wherein the request type comprises a request for a particular application, a type of application, or a request for an application associated with a specific server;

determine that a request type ban is not in effect for the request type of the first request;

in response to determining that the request type ban is not in effect for the request type, grant the first request by allocating the communication resource to the client device;

determine that the client device has maintained allocation of the communication resource for greater than a threshold amount of time, wherein the threshold amount of time is established based on the request type of the first request and observed completion time to complete tasks of the request type of the first request, wherein a type counter associated with all requests of the same type as the first request is incremented in response to determining that the client device has maintained allocation of the communication resource for greater than the threshold amount of time, and wherein the request type ban is instated in response to the type counter meeting or exceeding a threshold value; and in response to determining that the client device has maintained allocation of the communication resource for greater than the threshold amount of time, initiate the request type ban for the request type of the first request.

16. The computer program product of claim 15, further comprising program instructions configured to:

receive a second request of a same request type as the first request;

determine that the request type ban is in effect for the same request type as the first request; and in response to determining that the request type ban is in effect, deny the second request.

17. The computer program product of claim 15, further comprising program instructions configured to:

determine that the communication resource completed a task or that the communication resource has timed out;

deallocate the communication resource; and rescind the request type ban in response to determining that the communication resource has completed the task or timed out.

18. The computer program product of claim 15, wherein the communication resource is a process that establishes a communication channel between a web server and the application server.

\* \* \* \* \*